(12) United States Patent
Sweet

(10) Patent No.: US 10,105,905 B1
(45) Date of Patent: Oct. 23, 2018

(54) USING TRIANGULAR TESSELLATION IN 3D PRINTING

(71) Applicant: Apple Inc., Cupertino, CA (US)

(72) Inventor: Michael R. Sweet, Blezard Valley, CA (US)

(73) Assignee: Apple Inc., Cupertino, CA (US)

( * ) Notice: Subject to any disclaimer, the term of this patent is extended or adjusted under 35 U.S.C. 154(b) by 949 days.

(21) Appl. No.: 14/502,932

(22) Filed: Sep. 30, 2014

(51) Int. Cl.
*B33Y 30/00* (2015.01)
*B29C 67/00* (2017.01)
*B22D 23/00* (2006.01)

(52) U.S. Cl.
CPC ........ *B29C 67/0088* (2013.01); *B22D 23/003* (2013.01); *B29C 67/0059* (2013.01)

(58) Field of Classification Search
None
See application file for complete search history.

(56) References Cited

U.S. PATENT DOCUMENTS

| 6,569,373 | B2 * | 5/2003 | Napadensky | B41M 3/006 264/401 |
| 8,698,903 | B2 | 4/2014 | Wasula | |
| 2004/0141018 | A1 * | 7/2004 | Silverbrook | B22F 3/008 347/4 |
| 2010/0125356 | A1 * | 5/2010 | Shkolnik | G06T 1/00 700/98 |
| 2010/0191360 | A1 * | 7/2010 | Napadensky | G06T 17/00 700/98 |
| 2012/0249521 | A1 | 10/2012 | Sakurai | |
| 2014/0031967 | A1 | 1/2014 | Unger | |
| 2017/0239740 | A1 * | 8/2017 | Rosenvinge | B23G 5/06 |

FOREIGN PATENT DOCUMENTS

| DK | PA201470585 | * | 9/2014 |
| WO | 2011042899 A1 | | 4/2011 |

* cited by examiner

*Primary Examiner* — Matthew J Daniels
*Assistant Examiner* — Mohammad M Ameen
(74) *Attorney, Agent, or Firm* — Blank Rome LLP

(57) ABSTRACT

Systems, methods, and computer readable media to improve the operation of three dimensional (3D) printer systems are described. In general, techniques are disclosed for providing improved (smaller) print times and reduced consumption of material for a given end assembly. More particularly, a print-head motion exhibiting a triangular support pattern (aka triangular tessellation) is shown to be more efficient than circular print head motions used in current 3D printers in terms of speed and/or material usage.

21 Claims, 5 Drawing Sheets

USING TRIANGULAR TESSELLATION IN 3D PRINTING

BACKGROUND

This disclosure relates generally to techniques for printing three dimensional (3D) objects. More particularly, the disclosure relates to improved techniques for efficiently producing objects with a 3D printer.

Three dimensional printing is a process of making a 3D solid object of almost any desired shape from a digital model. Objects are generally made in 3D printing by using a process where successive layers of a desired material such as plastic or a type of metal are laid down in different shapes. In practice, a 3D printer may be a type of computer numerical control (CNC) that is capable of carrying out an additive process under computer control. While 3D printing technology has been around for many years, 3D printers have only recently become widely available commercially. As a result of their wide availability, applications for 3D printing have been extended to architecture, construction, automotive engineering, construction engineering, dental and medical industries. To extend the use of 3D printers to more industries and encourage more household use, it may be desirable to improve the 3D printing technology to enable 3D printers to print objects faster while also using fewer materials.

SUMMARY

In one embodiment the disclosed concepts provide a three-dimensional (3D) print system consisting of a material source (e.g., a roll of plastic or a container of liquid metal or a solid source of metal such as a thin fiber), a substrate, a print-head configured to deposit the material (from the material source) onto the substrate in a triangular tessellated pattern, where multiple layers of overlapping material in the triangular tessellated pattern form a three-dimensional element, and a positioning system configured to provide relative motion between the print-head and the substrate (i.e., either or both the print-head and substrate may be positioned independently). In one embodiment, the triangles making up the triangular tessellations are fixed-size triangles. In another embodiment, the triangles making up the triangular tessellations are dynamically sized triangles. By way of example, small triangles could be used to form an object's edges or other regions in which strength/support is needed. Larger triangles could be used to build-up or construct areas where strength/support is not as critical.

DETAILED DESCRIPTION

This disclosure pertains to systems, methods, and computer readable media to improve the operation of three dimensional (3D) printer systems. In general, techniques are disclosed for providing improved (smaller) print times and reduced consumption of material for a given end assembly. More particularly, a print-head motion exhibiting a triangular support pattern (i.e., forming triangular tessellations) is shown to be more efficient than circular print head motions used in current 3D printers in terms of speed and/or material usage.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of 3D print systems having the benefit of this disclosure.

Figure 1A:
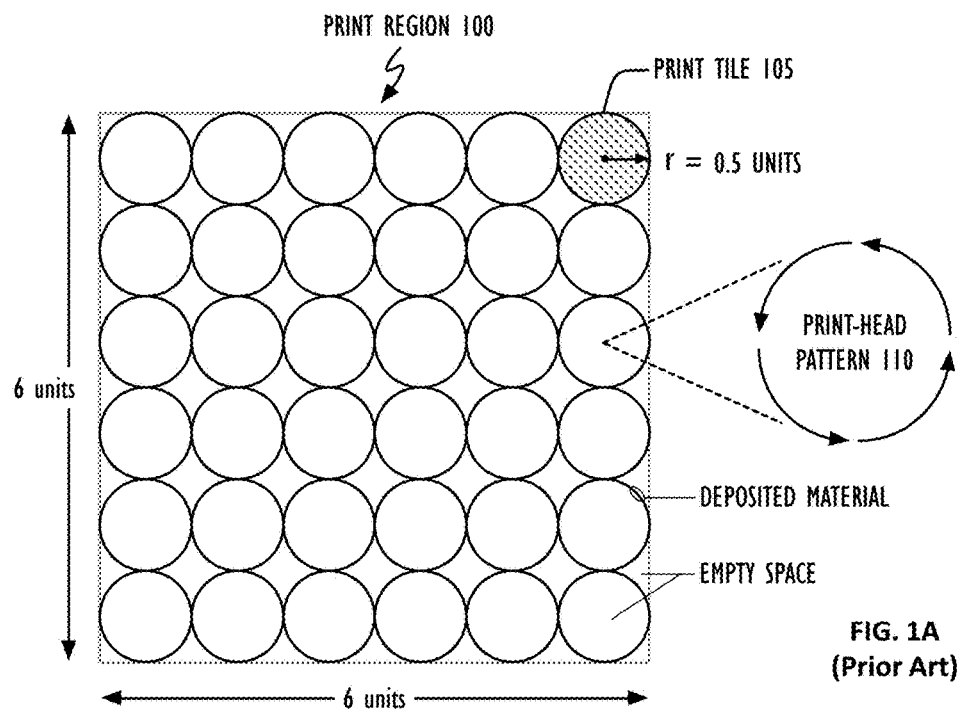
FIGS. 1A and 1B show an illustrative circular print-head pattern used by current three-dimensional (3D) print devices.
Figure 2A:
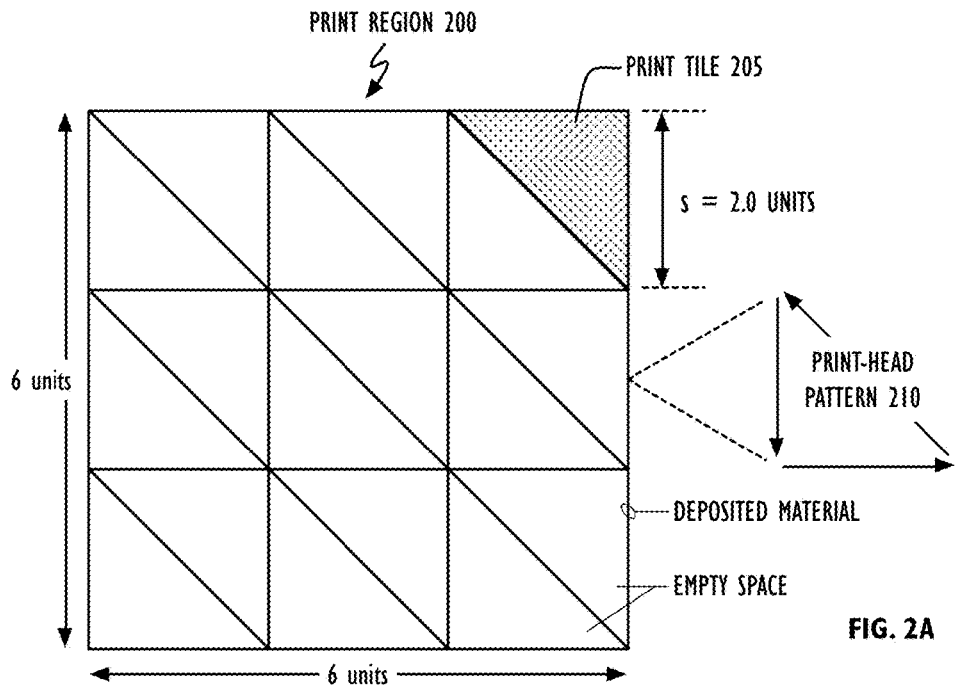
FIGS. 2A and 2B show an illustrative triangular tessellated print-head pattern in accordance with one embodiment.

Referring to FIG. 1A, a portion of an element's structural outline (print region 100) is shown in a top-down perspective. As illustrated, region 100 is made up of a six-by-six grid of print tiles 105, where material is deposited by a print-head in circular pattern 110. (While print-head pattern 110 has been shown as a counter-clockwise motion, a clock-wise motion could also be used.) As used here, the term "element" refers to any object or shape being created by a 3D printer. When the diameter of print tile 105 is 1.0 units, the maximum distance between any given point within region 100 and the support structure being deposited is 1.0 units, and the amount of material consumed in depositing one layer in region 100

$$\text{material} = 2\pi r(\text{rows})(\text{columns}) \qquad \text{EQ. 1}$$
$$= 2\pi(0.5)(6)(6) = 36\pi$$
$$\approx 113 \text{ units}$$

may be given as:

Referring to FIG. 2A, print region 200 in accordance with this disclosure is shown in a top-down perspective. Rather than depositing material in circular pattern 110 as shown in FIG. 1A, print tile 205 may be used to create a six-by-six grid, where the print-head pattern 210 is triangular. (While print-head pattern 210 has been shown as a counter-clockwise motion, a clock-wise motion could also be used.) To maintain conformity with FIG. 1A and therefore to permit direct comparison, each print tile's horizontal and vertical side (s) has been set equal to 2.0 making print region 200 equal to the size of print region 100. In print region 200, the diagonal of print tile 205 is always $(s^2+s^2)^{1/2}$, where s represents the length of print tile 205's side. To get the total length of the print region's diagonals, this value may be multiplied by the number of rows and the number of columns. Print region 200 may be divided by 2 dividers into 3 segments horizontally and vertically. With this background, the material consumed in depositing one layer may be given as:

$$\text{material} = s((\text{diagonal lengths}) + (\text{column lengths}) + \qquad \text{EQ. 2}$$
$$(\text{row lengths}))s(\sqrt{2}\,(\text{column no.})(\text{row no.}) + (\text{no.}$$
$$\text{column})(\text{no. row} - 1) + (\text{no. col} - 1)(\text{no.}$$
$$\text{column}))2(\sqrt{2}\,(3)(3) + (3)(3-1) + (3-1)(3))$$
$$\approx 49.5 \text{ units}$$

Comparing the results of EQS. 1 and 2 shows there is a 56% decrease in the amount of material needed to deposit an element using triangular print-head pattern 210 compared to prior art circular print-head pattern 110.

Figure 1B:
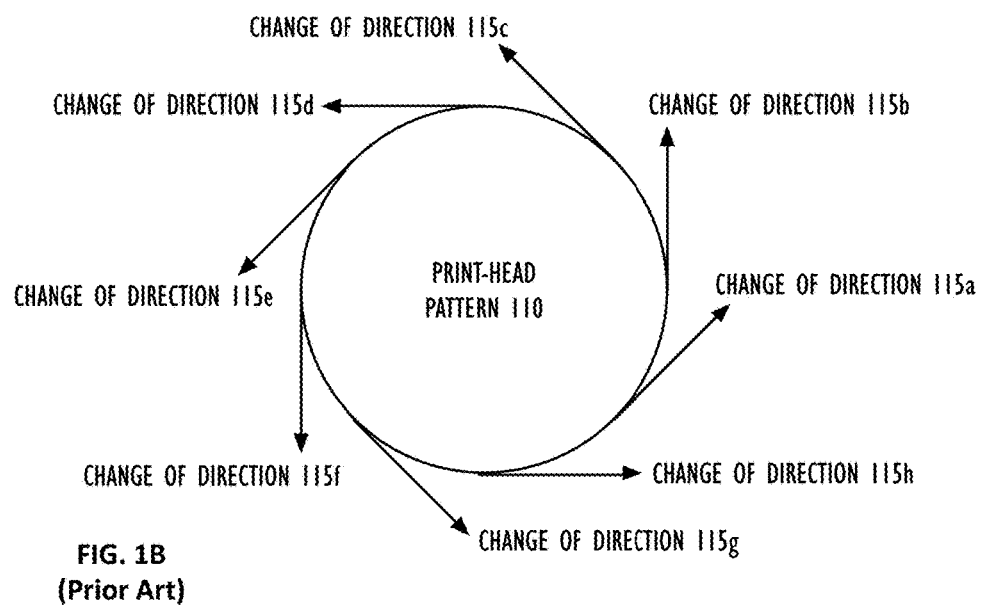
Figure 2B:
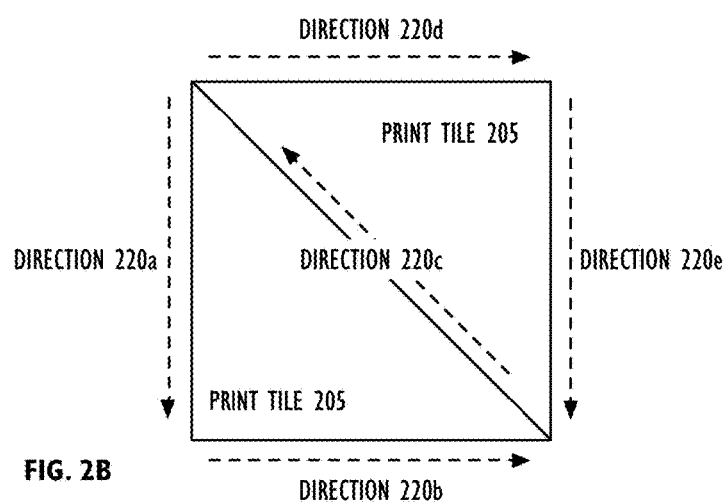

Another feature of the disclosed triangular print-head pattern may be seen by comparing FIGS. 1B and 2B. Referring first to FIG. 1B, print-head pattern 110 requires the 3D print head to constantly change direction (represented schematically as tangential velocity vectors 115a through 115h). This constant change is time consuming in that the print-head cannot be run as fast as it otherwise could (i.e., when not changing direction). In contrast, FIG. 2B shows that even when only a two print tiles 205 are taken into consideration, print-head motion in accordance with this disclosure changes direction only five (5) times. This permits the print-head mechanism to reach and maintain its maximum speed. Referring again to FIG. 2A, it is evident that print-head directions may be maintained for even longer distances when a larger region is considered (e.g., print region 200). This is not true when considering prior art print-head pattern 110.

Figure 3:
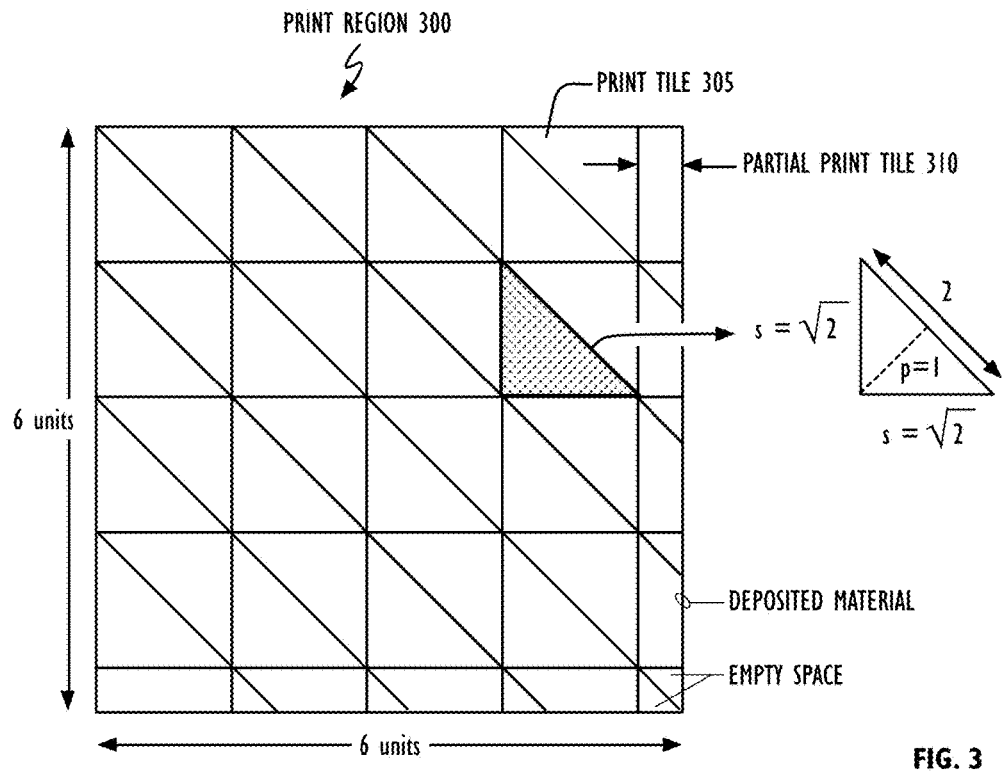
FIG. 3 shows an illustrative triangular tessellated print-head pattern in accordance with another embodiment.

Referring to FIG. 3, print region 300 again uses triangular print tiles 205, but in a higher density that that shown in FIG. 2. In FIG. 3, the size of each print tile 205 is chosen so that the maximum distance between any given point and the support structure being deposited is 1.0 units (identified as 'p') versus $\sqrt{2}$ in FIG. 2. Accordingly, the pattern illustrated in FIG. 3 provides the same degree of support as prior art print region 100 shown in FIG. 1. Because the sides of print tile 305 are no longer an even multiple print region 300's size, partial tiles 310 on both the side and bottom of print region 300 must be accounted for when determining the amount of material used when "printing" the illustrated structure. In print region 300, the diagonal of print tile 305 is always $(s^2+s^2)^{1/2}$ or 2.0, where s represents the length of print tile 205's side. To get the total length of the print region's diagonals, this value may be multiplied by the number of rows and the number of columns. The total length of the print tile's vertical and horizontal sides may be given by noting print region 300 may be divided into 4, 4.24 length segments both vertically and horizontally. With this background, the material consumed in depositing one layer may be given as:

$$\text{material} = s((\text{diagonal lengths}) + (\text{column lengths}) + (\text{row} \qquad \text{EQ. 3}$$
$$\text{lengths}))s(\sqrt{2}\,(\text{column no.})(\text{row no.}) + (\text{no.}$$
$$\text{column})(\text{no. row} - 1) + (\text{no. col} - 1)(\text{no.}$$
$$\text{column}))\sqrt{2}\,(\sqrt{2}\,(4.24)(4.24) + (4.24)(4) + (4)(4.24))$$
$$\approx 84.0 \text{ units}$$

Comparing the results of EQS. 1 and 3 shows there is a nearly 25% decrease in the amount of material needed to deposit an element using triangular print-head pattern 310 compared to prior art circular print-head pattern 110. And, while a tessellated pattern in accordance with FIG. 3 uses more material than a tessellated pattern in accordance with FIG. 2, it provides additional strength compared to the an element printed in accordance with the tessellated pattern of FIG. 2.

As illustrated by EQS. 2 and 3, using circular print-head pattern 100 results in a time- and resource-consuming process. This is in part because the sides of successive circles barely overlap (see FIG. 1), which requires the printer head to reposition itself more often than, for example, the triangular patterns shown in FIGS. 2 and 3 in which each side of a triangle wholly overlaps with the side of another triangle, thereby reducing the amount of printer head movement. Also as previously noted with respect to FIGS. 1B and 2B, a triangular print pattern allows the printer head to move faster than a circular pattern due to the simplicity of moving in straight lines instead of in arcs. It is further noted that 3D printing in a circular pattern such as print-head pattern 110 also requires more materials in order to maintain structural integrity. This is, in part, because a circular pattern requires the circles to be aligned one on top of the other, whereas in a triangular pattern, for example, the triangles may be offset to provide greater strength, thereby requiring fewer materials to support the structure.

Figure 4:
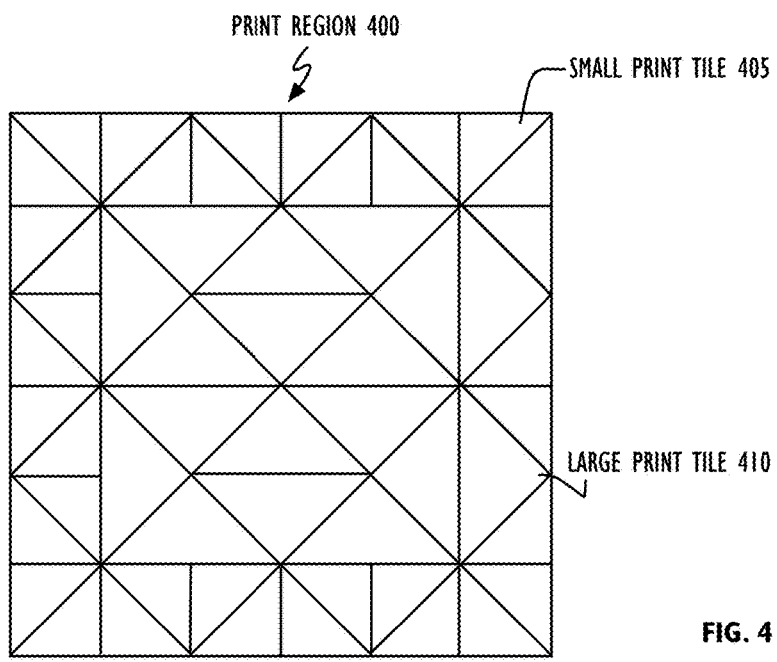
FIG. 4 shows an illustrative triangular tessellated print-head pattern in accordance with yet another embodiment.

In another embodiment, rather than using fixed-grid triangular patterns such as those shown in FIGS. 2 and 3, additional optimizations may be achieved using triangular tessellations whose size and placement are determined dynamically. An approach in accordance with this type of embodiment could, for example, use smaller print tiles in regions needing greater strength (e.g., such as near edges) and larger print tiles in regions where strength is not as important. In this way, material could be deposited in accordance with the needs of the particular design. Using a dynamic triangle tessellator (i.e. not a grid of fixed size triangles) would allow for further optimizations for providing greater strength in specific regions (such as near edges) and reduced material usage in less critical areas along the interior. By way of example, consider FIG. 4 which uses two print tile sizes, small print tiles 405 situated around the perimeter of region 400 and large print tiles 410 located more centrally.

Figures 5A, 5B:
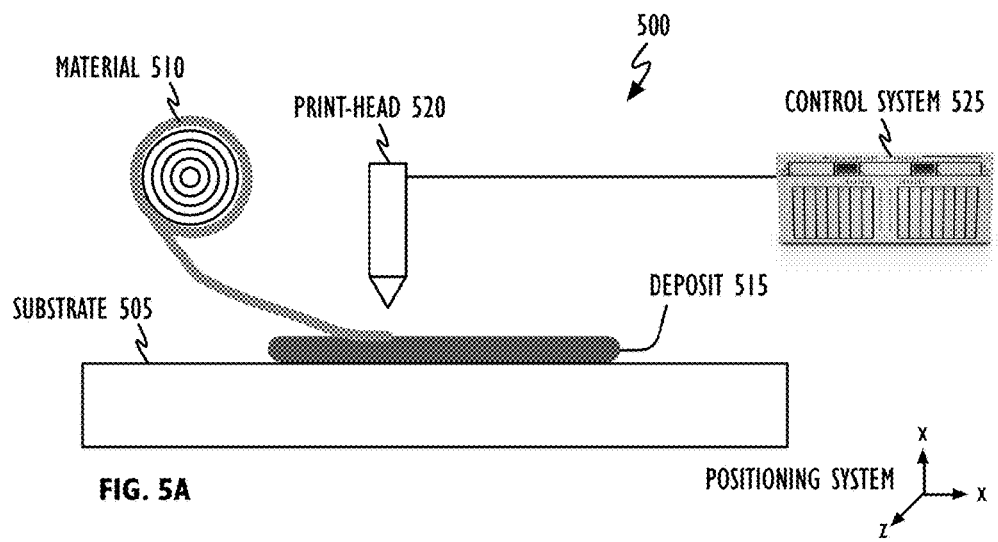
FIGS. 5A and 5B show a 3D print system in accordance with one embodiment.

Referring to FIG. 5A, in one embodiment 3D print system 500 includes substrate 505 upon which material 510 is deposited 515 when activated by print-head 520 under control of control system 525. In one embodiment, substrate 505 may be stationary while material 510 and print-head 520 are moved in the x, x, and z directions. In another embodiment, substrate 505 may be moved in the x and y directions, while material 510 and print-head 520 are moved in the z direction. In still another embodiment, material 510 may include various types of plastic. In yet another embodiment, material 510 may be a metal. Print-head 520 may include a heating mechanism and physical application mechanisms. In one embodiment, control system 525 is a special purpose control system. In another embodiment, control system 525 may be a general purpose computer driven by a special purpose application (e.g., a computer-aided design or CAD application). Referring to FIG. 5B, illustrative deposit 515 (shown on substrate 505) has been laid down or deposited using triangular print tiles as disclosed herein. In one embodiment, triangular tiles may be provided by control system 525 issuing commands to print-head 520. In another embodiment, print-head 520 includes an integral motion subsystem that moves print-head 525 in a triangular manner.

Figure 6:
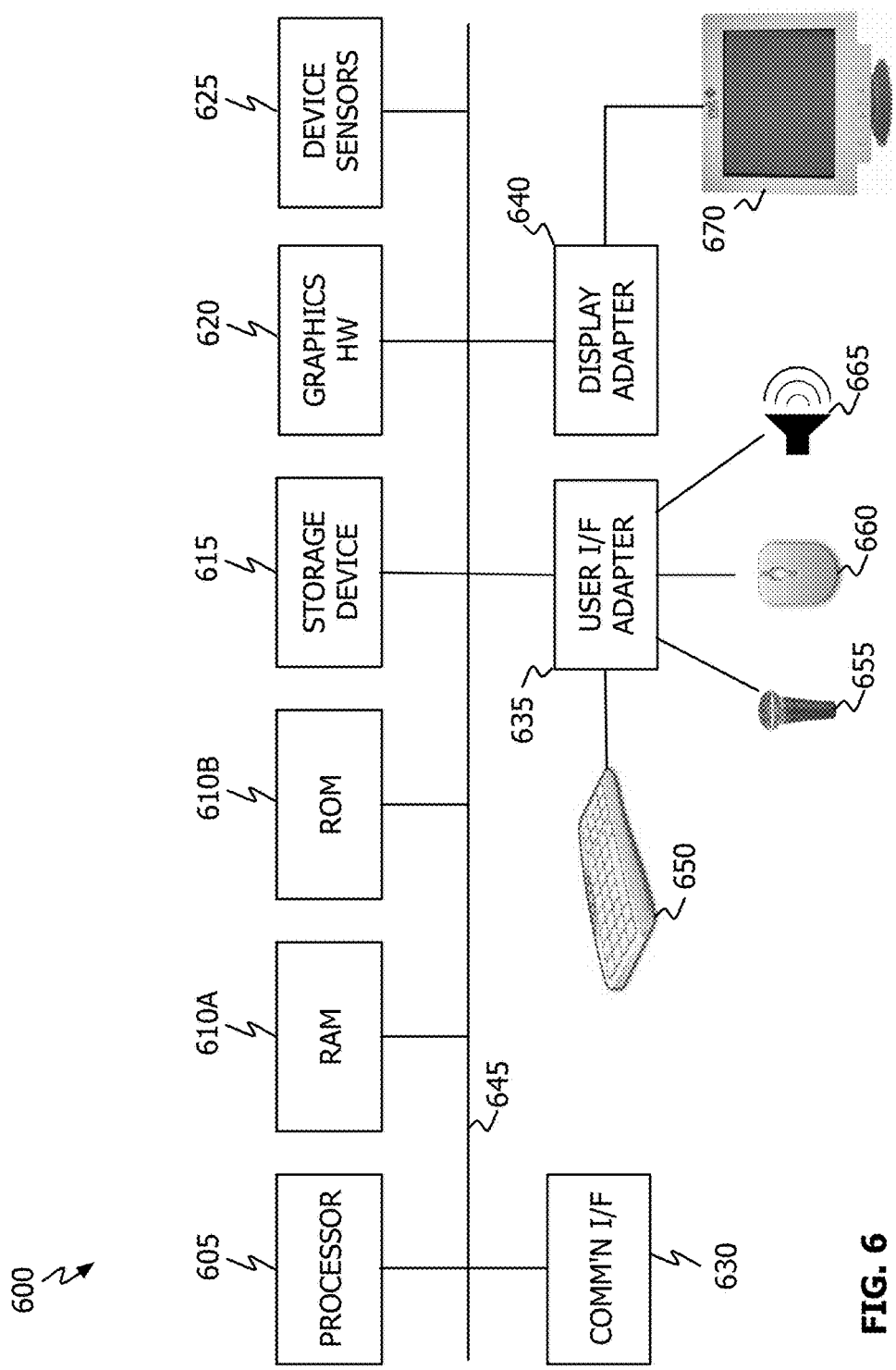
FIG. 6 shows, in block diagram form, a computer system in accordance with one embodiment.

Referring to FIG. 6, the disclosed embodiments may be performed by representative computer system 600 (e.g., control system 525 could be a general purpose computer system or a dedicated workstation). Computer system 600 may include one or more processors 605, memory 610 (610B and 610B), one or more storage devices 615, graphics hardware 620, device sensors 625 (e.g., proximity sensor/ambient light sensor, accelerometer and/or gyroscope), communication interface 630, user interface adapter 635 and display adapter 640—all of which may be coupled via system bus or backplane 645. Memory 610 may include one or more different types of media (typically solid-state) used by processor 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, computer program instructions organized into one or more modules and written in any desired computer programming language, and any other suitable data. When executed by processor 605 and/or graphics hardware 620 such computer program code may implement one or more of the methods described herein. Communication interface 630 may be used to connect computer system 600 to one or more networks. Illustrative networks include, but are not limited to: a local network such as a USB network; a business' local area network; or a wide area network such as the Internet and may use any suitable technology (e.g., wired or wireless). User interface adapter 635 may be used to connect keyboard 650, microphone 655, pointer device 660, speaker 665 and other user interface devices such as a touch-pad and/or a touch screen (not shown). Display adapter 640 may be used to connect one or more display units 670.

Processor 605 may execute instructions necessary to carry out or control the operation of many functions performed by device 600 (e.g., such as the generation and/or processing design documents to drive 3D printer mechanism 500). Processor 605 may, for instance, drive display 610 and receive user input from user interface 615. User interface 615 can take a variety of forms, such as a button, keypad, dial, a click wheel, keyboard, display screen and/or a touch screen. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs) and/or one or more GPU cores.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A three-dimensional printer system, comprising:
a material source;
a substrate;
a print-head configured to deposit material from the material source onto the substrate;
a positioning system configured to provide relative motion between the print-head and the substrate; and
a computer system configured to control the print-head to deposit material onto the substrate in a dynamically-sized triangular tessellated pattern,
wherein multiple layers of overlapping material in the triangular tessellated pattern form a three-dimensional element, and
wherein triangles in the dynamically-sized triangular tessellated pattern are smaller in edge portions of the three-dimensional element than they are in non-edge portions of the three-dimensional element.

2. The three-dimensional printer system of claim 1, wherein the material source is adapted to supply a plastic material to the print-head.

3. The three-dimensional printer system of claim 1, wherein the material source is adapted to supply a metal material to the print-head.

4. The three-dimensional printer system of claim 1, wherein at least one of the non-edge portions comprises an interior portion of the three-dimensional element.

5. The three-dimensional printer system of claim 1, wherein the dynamically-sized triangular tessellated pattern comprises a grid of dynamically-sized tessellations.

6. The three-dimensional printer system of claim 5, wherein the grid of dynamically-sized tessellations comprises two different sizes of print tiles.

7. The three-dimensional printer system of claim 1, wherein the computer system is operatively coupled to the positioning system, and wherein the computer system is further configured to control the relative motion between the print-head and the substrate.

8. The three-dimensional printer system of claim 7, wherein the computer system is further configured to move the print-head so as to deposit the material in the triangular tessellated pattern.

9. A three-dimensional printer system, comprising:
a computer system configured to control the print-head to deposit material onto a substrate in a dynamically-sized triangular tessellated pattern, wherein multiple layers of overlapping material in the triangular tessellated pattern form a three-dimensional element, and wherein triangles in the dynamically-sized triangular tessellated pattern are smaller in edge portions of the three-dimensional element than they are in non-edge portions of the three-dimensional element; and a positioning system configured to move the print-head in a triangular pattern when depositing material onto the substrate.

10. The three-dimensional printer system of claim 9, wherein at least one of the non-edge portions comprises an interior portion of the three-dimensional element.

11. The three-dimensional printer system of claim 9, wherein the dynamically-sized triangular tessellated pattern comprises a grid of dynamically-sized triangular tessellations.

12. The three-dimensional printer system of claim 11, wherein the grid of dynamically-sized triangular tessellations comprises two different sizes of print tiles.

13. The three-dimensional printer system of claim 9, further comprising a source configured to provide the material to the print-head.

14. The three-dimensional printer system of claim 13, further comprising a platform configured to receive material deposited by the print-head.

15. The three-dimensional printer system of claim 9, wherein the material comprises one of plastic and metal.

16. The three-dimensional printer system of claim 14, wherein the computer system is operatively coupled to the print-head and the platform, and wherein the computer system is further configured to control relative motion between the print-head and the substrate.

17. The three-dimensional printer system of claim 16, wherein the computer system is further configured to move the print-head so as to deposit the material in the triangular tessellated pattern.

18. The three-dimensional printer system of claim 1, wherein the triangles in adjacent layers of overlapping material are offset from each other.

19. The three-dimensional printer system of claim 5, wherein the grid of dynamically-sized tessellations comprises at least one partial tile.

20. The three-dimensional printer system of claim 9, wherein the triangles in adjacent layers of overlapping material are offset from each other.

21. The three-dimensional printer system of claim 11, wherein the grid of dynamically-sized tessellations comprises at least one partial tile.

\* \* \* \* \*

UNITED STATES PATENT AND TRADEMARK OFFICE
CERTIFICATE OF CORRECTION

PATENT NO. : 10,105,905 B1
APPLICATION NO. : 14/502932
DATED : October 23, 2018
INVENTOR(S) : Michael R. Sweet It is certified that error appears in the above-identified patent and that said Letters Patent is hereby corrected as shown below:

In the Claims

Claim 9 at Column 6, Line 65 should read -- a computer system configured to control a print-head to --

Signed and Sealed this
Nineteenth Day of March, 2019

Andrei Iancu
*Director of the United States Patent and Trademark Office*